US008449737B2

(12) United States Patent
Richardson (10) Patent No.: US 8,449,737 B2
(45) Date of Patent: May 28, 2013

(54) HYDROGEN AND OXYGEN GENERATOR HAVING SEMI-ISOLATED SERIES CELL CONSTRUCTION

(76) Inventor: David Thomas Richardson, Draper, UT (US)

( * ) Notice: Subject to any disclaimer, the term of this patent is extended or adjusted under 35 U.S.C. 154(b) by 773 days.

(21) Appl. No.: 12/584,928

(22) Filed: Sep. 14, 2009

(65) Prior Publication Data

US 2010/0065419 A1    Mar. 18, 2010

Related U.S. Application Data

(60) Provisional application No. 61/096,776, filed on Sep. 13, 2008.

(51) Int. Cl.
*C25B 9/06* (2006.01)
*C25B 9/20* (2006.01)
*C25B 1/06* (2006.01)

(52) U.S. Cl.
USPC ........... 204/268; 204/269; 204/270; 204/278; 204/278.5; 205/628

(58) Field of Classification Search
USPC ...................................................... 204/278.5
See application file for complete search history.

(56) References Cited

U.S. PATENT DOCUMENTS

| | | | | |
|---|---|---|---|---|
| 3,310,483 A | * | 3/1967 | Rhodes | 204/268 |
| 3,957,618 A | * | 5/1976 | Spirig | 204/270 |
| 4,081,656 A | * | 3/1978 | Brown | 219/137.31 |
| 4,085,028 A | * | 4/1978 | McCallum | 204/269 |
| 4,113,601 A | * | 9/1978 | Spirig | 204/228.5 |
| 4,140,090 A | * | 2/1979 | Lindberg | 123/265 |
| 4,142,959 A | * | 3/1979 | McCallum | 204/288.1 |
| 4,450,060 A | * | 5/1984 | Gonzalez | 204/268 |
| 5,049,252 A | * | 9/1991 | Murrell | 204/268 |
| 5,614,069 A | * | 3/1997 | Lin | 204/268 |
| 5,711,865 A | * | 1/1998 | Caesar | 205/628 |
| 5,733,422 A | * | 3/1998 | Lin | 204/228.2 |
| 5,756,874 A | * | 5/1998 | Steward | 588/302 |
| 6,257,175 B1 | * | 7/2001 | Mosher et al. | 123/3 |
| 6,336,430 B2 | * | 1/2002 | de Souza et al. | 123/3 |
| 6,630,061 B2 | * | 10/2003 | Lee et al. | 204/270 |
| 6,821,398 B2 | * | 11/2004 | Von Broembsen | 204/278.5 |
| 6,866,756 B2 | * | 3/2005 | Klein | 204/268 |
| 7,014,740 B2 | * | 3/2006 | Kim | 204/278.5 |
| 2004/0149591 A1 | * | 8/2004 | Klein et al. | 205/628 |
| 2005/0126515 A1 | * | 6/2005 | Balan et al. | 123/3 |
| 2005/0217991 A1 | * | 10/2005 | Dahlquist, Jr. | 204/267 |
| 2008/0047840 A1 | * | 2/2008 | Stockdale | 205/631 |
| 2010/0276279 A1 | * | 11/2010 | Arnett et al. | 204/274 |

* cited by examiner

*Primary Examiner* — Harry D Wilkins, III
(74) *Attorney, Agent, or Firm* — Angus C. Fox, III (57) ABSTRACT

An electrolyzer assembly includes an electrolysis unit having: a hermetically-sealed case made at least partially from a durable dielectric polymer material, the case having a gas outlet and an electrolyte inlet; at least one set of series-coupled, equally-spaced, rectangular, vertically-oriented metal plates installed within the case, each set having first and second end plates, each plate having each side edge sealed to a case wall panel and a bottom edge sealed to the bottom panel; a ground connection to each first end plate; and a voltage connection to each second end plate that is non-zero with respect to the ground connection, thereby providing at least a 1.5 voltage differential between each pair of adjacent plates when gaps between each adjacent pair of plates are filled with electrolyte.

19 Claims, 9 Drawing Sheets

HYDROGEN AND OXYGEN GENERATOR HAVING SEMI-ISOLATED SERIES CELL CONSTRUCTION

This application has a priority date based on Provisional Patent Application No. 61/096,776, which has a filing date of Sep. 13, 2008, and is titled HYDROGEN AND OXYGEN GENERATOR FOR INTERNAL COMBUSTION ENGINES.

BACKGROUND OF THE INVENTION

1. Field of the Invention

The present invention is related to an apparatus and method of improving the fuel efficiency of an internal combustion engine, and in particular, to an apparatus and method for hydrolyzing water into a mixture comprising hydrogen gas and oxygen gas, which is combined with the fuel and air mixture used in an internal combustion engine.

2. History of the Prior Art

During the past 30 years, significant advances have been made in internal combustion engine technology that have dramatically improved the efficiency of internal combustion engines. For gasoline engines, four-valve-per-cylinder combustion chamber designs, coupled with computer monitoring of the combustion process and computer control of both valve timing and fuel injection, have resulted in significant gains in fuel economy. Whereas in the 1950s and 1960s, two and three-speed automatic transmissions were 10 to 20 percent less efficient than manual transmissions, the computer-controlled, six and seven-speed automatic transmissions of the twenty-first century are, typically, more efficient than manual transmissions. Although added weight from new safety features and a host of accessories that have become "essential" have somewhat reduced the effect of gains in drivetrain efficiency, a large percentage of the gain in efficiency has been applied by vehicle manufacturers to engine power output. The result has been very little overall increase in corporate average fuel efficiency during the past 25 years.

The rapid rise of the price of crude oil in 2007 and 2008 has traumatized the transportation industry. Most global airline companies are sustaining huge operating losses because of high fuel costs, and are headed for insolvency. U.S. automobile manufacturers, who have long relied on fuel-guzzling, high-markup light trucks and SUVs for most of their profits, have watched sales of those vehicles drop precipitously. Not since the early 1970s has such an economically compelling reason existed for U.S. consumers to purchase fuel-efficient vehicles. Since the 1975, U.S. Federal regulations have attempted to pressure automobile manufacturers to improve the fuel efficiency of their corporate offerings. Although the price of crude oil has apparently peaked and is headed down, few consumers will be willing to risk purchasing a fuel-inefficient vehicle any time soon. Thus, economics may prove to be a far more effective incentive for improving the fuel efficiency of new vehicles than any government regulation.

A number of new technologies have shown great promise in enhancing the efficiency of internal combustion engines. Computer-controlled, common-rail, ultra-high-pressure direct injection designs have greatly improved the fuel economy and reduced emissions of a new generation of diesel engines. Internal combustion steam engines, which are still in the earliest stages of development, have demonstrated dramatic increases in thermal efficiency.

This patent application deals with another technology that has been shown to enhance the operational efficiency of conventional internal combustion engines operating primarily on conventional fuels such as gasoline, ethanol, and gasoline-ethanol mixtures. The technology is implemented by introducing a mixture of small quantities of hydrogen gas ($H_2$) and oxygen gas ($O_2$) (commonly called Brown's gas or oxyhydrogen gas) generated by an electrolyzer into the intake manifold of the internal combustion engine. It is believed that the explosive reaction of hydrogen and oxygen in the combustion chambers of the engine promotes more complete combustion of the primary fuel, with a corresponding decrease in incomplete combustion products, such as soot and carbon monoxide. The hydrolysis of water to produced both hydrogen and oxygen gases is well known in the art. Water is, of course, a non-flammable, stable and safe compound. However, as hydrogen and oxygen gases are both unstable, highly-reactive, and—when combined—potentially explosive, utilization of hydrogen gas in vehicular applications must be undertaken with great care and intelligent equipment design.

There is a plethora of electrolyzers being offered for sale on every forum imaginable, including eBay and Craig's List. A recent search for "electrolyzer" on eBay found over 100 electrolyzers of various designs for sale. A search using the descriptor "hydrogen generator" found over 1500 items for sale! Most of these electrolyzers are intended for use in vehicular applications. Many are crude, barely-usable contraptions being hocked by fast-buck artists. Others are more refined designed and include all the components required for integrating the output from the electrolyzer into the vehicle's induction system. There are a number of problems associated with the current generation of electrolyzers. The first is that many are designed so that the full voltage from the vehicle's electrical system (typically 14-volts DC) is applied to one or multiple cells, each having a single anode and a single cathode and immersed in an open electrolyte bath. Most of the energy consumed by such an electrolyzer is converted to heat. The heat causes the electrolyte solution to froth and boil, resulting in electrolyte, along with hydrogen and oxygen gases, being introduced into the intake manifold of the vehicle. A second problem is a lack of compactness that makes it difficult, if not impossible, to install an electrolyzer system within the already-crowded engine compartments of many of today's vehicles. It should be understood that compactness encompasses not only volume, but height as well. Many light trucks, for example, have auxiliary battery trays so that two full size batteries can be installed within the engine compartment. However, most vehicles produced during the past twenty years were designed for low-profile, side-terminal batteries. The use of space normally allocated for an auxiliary battery for installation of an electrolyzer system presents difficult design challenges if adequate hydrogen generating capacity is to be maintained. A third problem relates to the complexity of existing electrolyzer designs. Complexity not only increases manufacturing costs, but also typically results in a decrease in reliability.

U.S. Pat. No. 3,310,483 to William A. Rhodes discloses a multicell oxy-hydrogen generator having a plurality of spaced plates submersed in an electrolyte which operate electrically in series with each other. The plates are enclosed within a case having grooved, opposed side panels and a grooved bottom panel. The grooved side panels and the grooved bottom panel form individual slots for each plate, thereby maintaining a desired spacing between the plates. However, the individual cells are not isolated from one another, which leads to significant current leakage between cells. A preferred embodiment of the device has 60 plates, and is designed to operate with fully rectified, 120 VAC house current. There is no provision for maintaining an optimum level of electrolyte within the case, other than manually filling the case, as needed.

U.S. Pat. No. 5,231,954 to Stowe (the '954 patent) discloses an electrolysis cell, having a pair of axially-concentric electrodes, for generating hydrogen and oxygen gases which are added to the fuel delivery system as a supplement to the hydrocarbon fuels burned therein. The design eliminates the hazard of explosion of the hydrogen-oxygen gas mix by withdrawing the gases through a connection with the vacuum line of the positive crankcase ventilation (PCV) system of the engine and by utilizing a slip-fitted top cap for the electrolysis cell, which cooperates with the PCV vacuum line to prevent explosive containment of generated gases in case of accident. U.S. Pat. No. 6,209,493 B1 (the '493 patent) discloses a kit that uses an electrolytic cell to produce hydrogen and oxygen that may either be separated or mixed before the gases are introduced to a vehicle fuel system. Although each of these systems may increase fuel efficiency, there are a number of drawbacks associated with these systems. A first drawback is the use of electrolytic cells which use a voltage of 12-14 volts. This relatively high voltage generates an unnecessary amount of heat, which effectively decreases the benefit from any increase in combustion efficiency. A second drawback is the use of electrodes having a relatively small surface area. This small surface area translates into limited hydrogen/oxygen generation capacity. A third drawback—particularly in the system disclosed in the '493 patent—is the difficulty for end users to replace worn system components in such a highly integrated system. U.S. Pat. App. No. 2005/0258049 by Dennis Klein discloses an electrolyzer that supposedly eliminates the drawbacks of the devices disclosed in the '954 and '493 patents. Like the prior art devices, the Klein device is adapted to generate hydrogen and oxygen gases for introduction into the intake manifold of an internal combustion engine. From the disclosure, it appears that Klein is providing an array of parallel plates, with the plates alternately coupled to ground and full positive battery voltage. The result is an electrolyzer with 12-14 volts DC applied to every cell. The amount of heat generated is so high that Klein provides cooling fins on the outer surface of the case which encloses the plates and holds a supply of electrolyte. In addition, the electrode plates of the Klein device are immersed in an unpartitioned supply of electrolyte. Failure to partition the plates may lead to unnecessary current leakage between electrode plates. Current leakage will waste energy in the form of heat.

Accordingly, there exists a need for improved devices for generating hydrogen and oxygen gases that are simple to fabricate, efficient to operate, provide ample gas output without the generation of unnecessary amounts of heat, and which are equipped with means for automatic replenishment of electrolyte.

SUMMARY OF THE INVENTION

The present invention overcomes the problems encountered in the prior art by providing an electrolyzer assembly for electrolyzing water into a mixture comprising hydrogen gas and oxygen gas. The electrolyzer assembly is adapted to deliver the gaseous mixture to the fuel system of an internal combustion engine that when combusted with the fuel, the efficiency of the engine is improved. The electrolyzer assembly of the present invention includes an electrolysis unit having a plurality of generally evenly-spaced, series-coupled laminar metal plates, which are submersed in electrolyte within a generally fluid-tight case having both a gas outlet and a filler inlet. Each pair of adjacent laminar plates forms an electrolytic cell when a voltage differential exists between them. For a preferred embodiment of the invention, the plates are sealed around the side and lower edges so that electrical current leakage will not occur between plates. Electrolyte level above the plates is minimized by having an electrolyte inlet near the bottom of the case and a gas outlet in the case lid, the gas escape entrance of which is positioned at generally the same level as the top of the plates. Any excess electrolyte will, therefore, escape through the gas outlet, along with electrolytically-generated hydrogen and oxygen gases, and return to the supply tank. As the cavity above the plates is sealed, electrolyte generally cannot rise above the level of the top of the plates. A presently preferred embodiment of the electrolysis unit for a vehicular electrical system of nominal 12 VDC employs at least one plate assembly having six or seven, serially-coupled cells, such that the voltage applied between adjacent plates, for a 12-volt electrical system, is about 2 volts. For a vehicular electrical system of nominal 24 VDC, at least one plate assembly having twelve to fourteen, serially-coupled cells. In any case, the optimum voltage range for electrolyzing water into hydrogen and oxygen gases is about 1.5 to 2.0 VDC per electrolytic cell.

The electrolysis unit also incorporates at least one electrolyte supply chamber, which maintains electrolyte levels within an acceptable range for an extended period of time. The fluid exit from the supply chamber is placed at a level above the top of the plates within the electrolysis unit. Electrolyte feeds from the supply chamber to the electrolysis unit by gravity. As the electrolyte return and gas entrance to the electrolyte supply tank is near the bottom thereof, the electrolyte supply tank also functions as a flashback arrestor and as a bubbler filter for the hydrogen and oxygen gases. Gravel can be placed in the bottom of the supply tank in order to break up the incoming bubbles into smaller ones. Alternatively, the inlet to the supply tank can be equipped with a screen to break up the bubbles.

The gas outlet on the electrolysis unit is coupled to a gas inlet at or near the bottom of the electrolyte supply tank. As electrolyte within the electrolysis unit has a tendency to bubble and froth as hydrogen and oxygen are generated when 12 VDC is applied to each six-cell bank of the electrolysis unit—particularly at startup time—the coupling of the gas outlet to the electrolyte supply tank tends to recover any electrolyte that is expelled through the gas outlet of the electrolysis unit. A vent at the top of the electrolyte supply tank is coupled to the air intake of the internal combustion engine.

In order to simplify construction of the electrolysis unit, a preferred embodiment of the case includes at least a pair of opposed, grooved side panels, a grooved floor panel that is unitary with the side panels, and a top panel that is sealed to the side panels. The floor and side panel unit is preferably injection molded from a polymeric engineering thermoplastic. Preferred engineering plastic materials for this application differ from commodity plastics such as polystyrene (PS), polyvinyl chloride (PVC), polypropylene (PP) and polyethylene (PE) in that they have improved resistance to heat, increased rigidity, greater mechanical strength, and increased levels of chemical stability. Examples of engineering plastics, that are deemed appropriate for this application, include acrylonitrile butadiene styrene (ABS), polycarbonates (PC), polyamides (PA), polybutylene terephthalate (PBT), polyethylene terephthalate (PET), polyphenylene oxide (PPO), polysulphone (PSU), polyetherketone (PEK), polyetheretherketone (PEEK), and polyimides. Although not considered engineering plastics, Sintra® (a moderately-expanded, closed-cell rigid PVC sheet material developed in Europe by Alusuise, UHDPE (ultra-high molecular weight poly ethylene) and HDPE (high-density poly ethylene) may also be used successfully for the case material. Each groove in the floor panel is aligned with a groove on each side panel, forming a slot. A laminar plate slips into each slot and is sealed with a waterproof, chemically inert, and heat-resistant sealant around the edges to minimize current leakage between cells. Although for a preferred embodiment of the invention, the laminar plates are made of stainless steel, other metals such as nickel or nickel steel alloys may also be used. The primary factors to be considered for any metal or metal alloy contemplated for manufacture of the laminar plates are cost, resistance to corrosion, and electrical resistance. The electrolyte in which the laminar plates are submersed may be selected from many different types, including aqueous solutions of sodium bicarbonate, potassium bicarbonate, sodium hydroxide, potassium hydroxide, and combinations thereof. It has been found that hydroxide solutions—particularly potassium hydroxide solutions—work very well and are inexpensive. Although acidic solutions, such as acetic acid, can also function as electrolyte, acids tend to foster corrosion of metal components.

For 24-volt first embodiment of the invention, the case of the electrolysis unit has four thermoplastic side walls (two of which are grooved), a grooved floor panel continuous with the side walls, and a top panel that is sealed to the tops of the side walls. For second embodiment, the case of the electrolysis unit has two opposed grooved thermoplastic side walls, a grooved floor panel continuous with the side walls, and a top panel. The outermost laminar plates of the electrolysis unit function as a pair of opposed side walls to complete the case enclosure. The edges of both of those two outermost laminar plates are bonded to the side walls, grooved floor and top panel in order to provide a leakproof case. The top panel of the case is equipped with a pair of spaced-apart longitudinal grooves that facilitate sealing of the upper edges of the laminar plates to the top panel. For the latter embodiment electrolysis unit, electrical connections are most easily made to the outermost plates and through the top panel. For a six- to seven-cell unit, a ground electrical connection can be made to one of the outermost panels, and a 12 VDC connection can be made to the other. For a twelve- to fourteen-cell unit, the ground electrical connections can be made to each of the outermost panels, and a 12 VDC connection can be made through the top panel to the centermost plate or plates. A third embodiment electrolysis unit is similar to the first embodiment unit, except that it is a 12-volt unit having seven plates and six cells. A fourth embodiment unit does not have a grooved case, but rather relies on a dielectric screw which passes through a central aperture of each plate. Each adjacent pair of plates has a dielectric washer between them that is fitted to the screw. When the screw is tightened through the plate assembly, the plates assume a generally evenly spaced configuration. These plates are inserted as an assembly into an ungrooved lower case portion. However the lower and side edges of the plates are sealed to the sides and bottom of the case, respectively with a waterproof sealer, such as polyurethane adhesive sealant. The sealer is also preferably used with the embodiments having a grooved lower case portion in order to minimize current leakage between plates. For the fourth embodiment electrolysis unit, the input connections are made through the vertical ends of the lower case portion. Epoxy is used to effectively waterproof the holes in the case ends through which threaded terminals pass.

DETAILED DESCRIPTION OF THE INVENTION

The invention will now be described in detail with reference to the attached drawing figures. It should be understood that although no attempt has been made to inaccurately portray the drawings, they still may not be drawn to scale.

The present invention is designed to provide a mixture of hydrogen and oxygen gases for use in internal combustion engines in combination with the primary fuel burned therein. The term "internal combustion engine", as used herein, refers to any engine in which a fuel-air mixture is burned within the engine itself so that the hot gaseous products of combustion act directly on the surfaces of engine's moving parts. Such moving parts include, but are not limited to, pistons or turbine rotor blades. Internal-combustion engines include spark-ignition and compression-ignition engines of both two-stroke and four-stroke cycle types, gas turbine engines, jet engines, and rocket engines.

Figure 1:
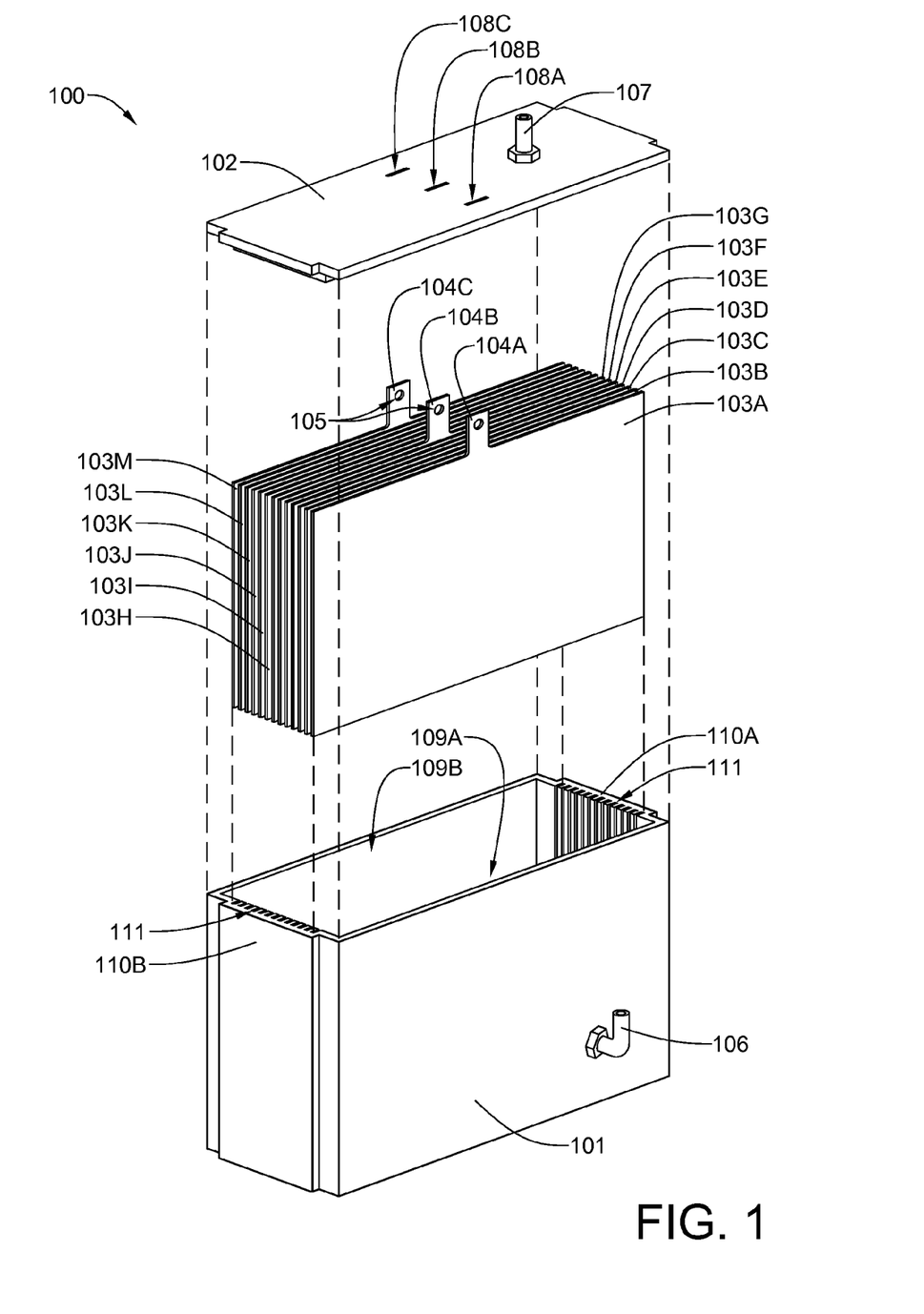
FIG. 1 is an exploded isometric view of a first embodiment.

Referring now to FIG. 1, an exploded first embodiment electrolysis unit 100 includes a case lower portion 101, a case lid 102, thirteen evenly-spaced, parallel laminar plates 103A-103M (103, generally). It will be noted that laminar plates 103A, 103G and 103M each have an electrical connector tab 104A, 104B and 104C, respectively, which extend from an upper central portion thereof. Each of the three connector tabs has an aperture 105 for receiving a threaded fastener that will secure an electrical cable to the connector tab. Laminar plates 103A and 103M will receive a chassis ground connection, while laminar plate 103G will receive a connection to a nominal voltage of 12 VDC. It will be noted that the case lower portion 101 is equipped with an electrolyte inlet 106. It will be further noted that the case lid has a gas outlet 107. It will be further noted that the case lid 102 has three rectangular slits 108A, 108B and 108C, which fit over the three connector tabs 104A, 104B and 104C, respectively. It will also be noted that the case lower portion 101 is shaped so that there are two electrolyte supply chambers 109A and 109B on opposite sides of the laminar plate array when the latter is installed within the case lower portion 101. It will be further noticed that the case lower portion 101 has grooves 111 on the end side walls 110A and 110B. The floor panel (not shown) is also grooved. Each groove in the floor panel is aligned with a groove on each side panel 110A and 110B, together forming a plate receiving slot. A laminar plate 103 slips into each plate receiving slot. The primary factors to be considered for any metal or metal alloy contemplated for manufacture of the laminar plates are cost, resistance to corrosion, and electrical resistance. A suitable metal from which the laminar plates are fabricated includes, but is not limited to, nickel, nickel containing alloys, and stainless steel (which is typically a nickel alloy of steel). The laminar plates 103 are brushed or otherwise roughened in order to increase surface area. The case lower portion 101 will be filled with an electrolyte, thereby covering most of the surface area of the laminar plates 103A-103M to a level about 1.0-1.5 cm below the top edges of the plates. The electrolyte is an aqueous solution containing ions which enable the solution to conduct electricity. The electrolyte in which the laminar plates are submersed may be selected from many different types, including aqueous solutions of sodium bicarbonate, potassium bicarbonate, sodium hydroxide, potassium hydroxide, and combinations thereof. Potassium hydroxide is presently deemed the preferred compound for addition to distilled water for creating the electrolyte.

Figure 2:
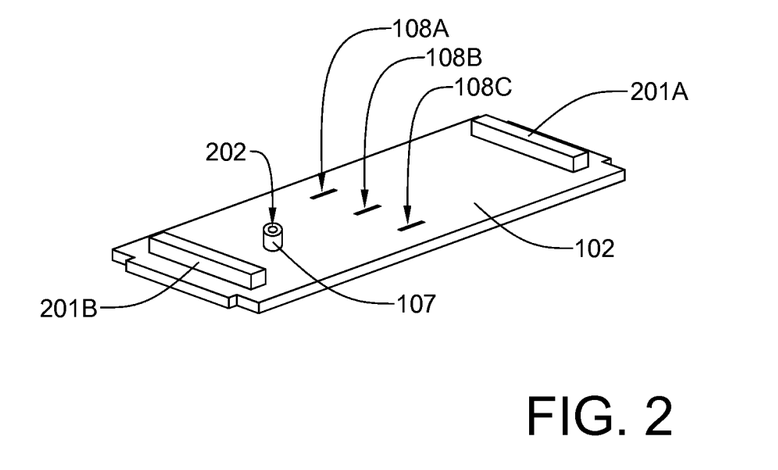
FIG. 2 is a bottom view of the case lid of the first embodiment electrolysis unit.

Referring now to FIG. 2, in this bottom view of the case lid 102, it can be seen how the gas outlet 107 extends below the lower surface of the lid 102 an amount that places the gas escape entrance 202 at the level of the top of the plates 103A-103M when the electrolysis unit 100 is assembled. In addition, two bars 201A and 201B, which are integral with the case lid 102, maintain the laminar plates 103 seated within their respective plate receiving slots when the case lid 102 is secured to the case lower portion 101. It will be noted that the case lid 102 also incorporates three narrow rectangular slits 108A, 108B and 108C, which fit over the electrical connector tabs 104A, 104B and 104C, respectively when the case lower portion 101, the case lid 102 are assembled with the laminar plates 103A-103M installed within the case lower portion 101.

Figure 3:
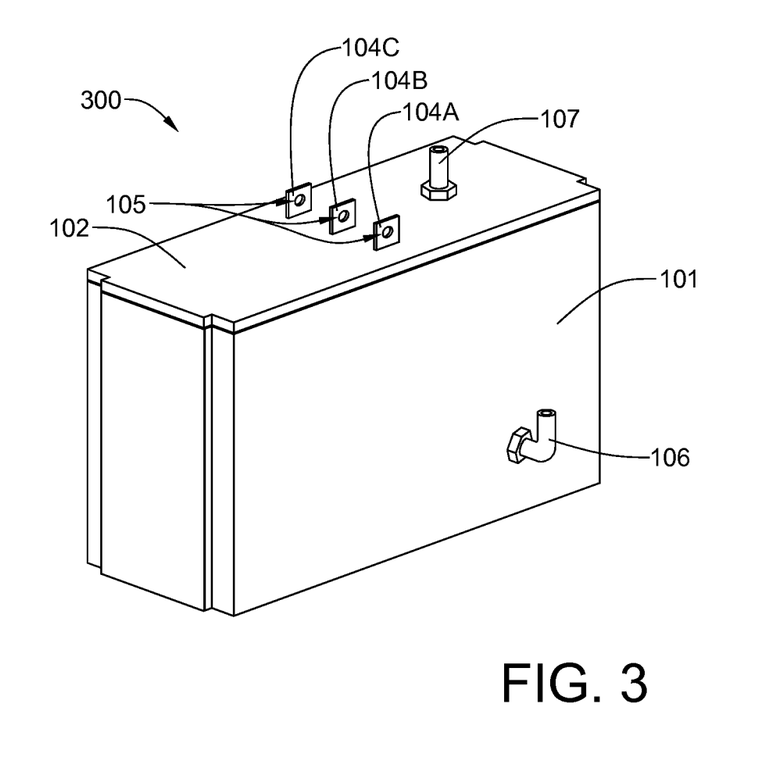
FIG. 3 is an isometric view of the assembled first embodiment electrolysis unit.

Referring now to FIG. 3, an assembled first embodiment electrolysis unit 300 has been assembled, with the thirteen laminar plates 103A-103M seated within their respective plate receiving slots within the case lower portion 101, and the case lid 102 secured to the case lower 101. A waterproof, chemically inert and heat-resistant sealant, such as polyurethane adhesive/sealant may be used successfully for this application. Other sealants, such as RTV silicon rubber sealant, may also be used.

Figure 4:
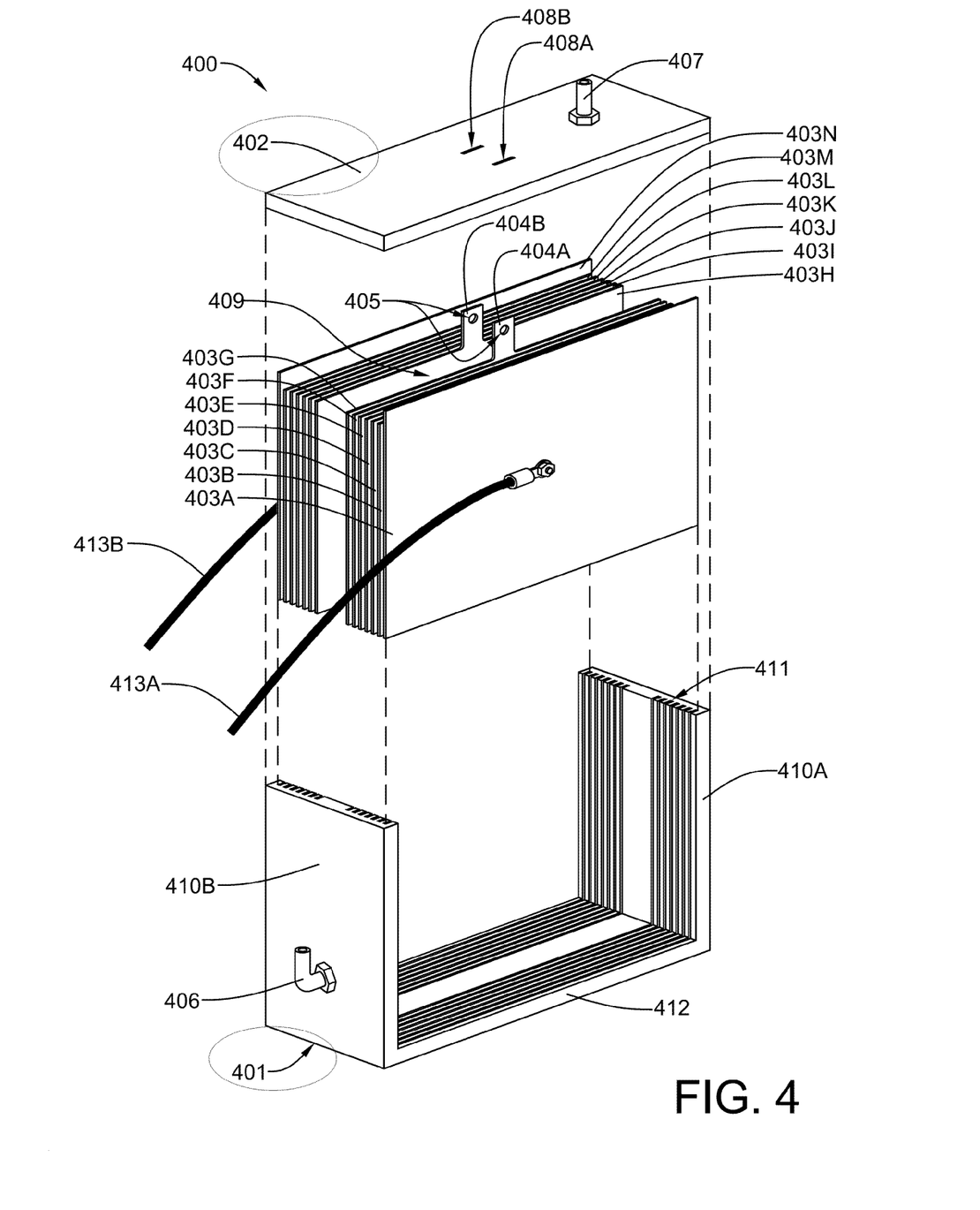
FIG. 4 is an exploded isometric view of a second embodiment electrolysis unit.

Referring now to FIG. 4, an exploded second embodiment electrolysis unit 400 includes a case lower portion 401, a case lid 402, and two groups of seven evenly-spaced, parallel laminar plates arranged in two spaced-apart groups. The first group includes laminar plates 403A-403G; the second group includes laminar plates 403H-403N (403, generally). It will be noted that laminar plates 403G and 403H each have an electrical connector tab 404A and 404B, respectively, which extend from an upper central portion thereof. Each of the two connector tabs 404A and 404B has an aperture 405 for receiving a threaded fastener that will secure an electrical cable to the connector tab. Laminar plates 403G and 403H will receive a connection to a nominal voltage of 12 VDC through connector tabs 404A and 404B. It will be noted that laminar plates 403A and 403N are taller than the other laminar plates. Each of these two plates will also function as part of the lower case portion 401 and will be sealed around their edges with waterproof sealant. Laminar plates 403A and 403N will also be connected to chassis ground through conductors 405A and 405B, respectively. It will be noted that the case lid 402 has a gas outlet 407. It will be further noted that the case lid 402 has two rectangular slits 408A and 408B, which fit over the two connector tabs 404A and 404B, respectively. For this second embodiment electrolysis unit 400, the void between laminar plates 403G and 403H functions as an electrolyte supply chamber 409. It will be further noticed that the case lower portion 401 has grooves 411 on the end side walls 410A and 410B. The floor panel 412 is also grooved. Each groove in the floor panel 412 is aligned with a groove on each side panel 411A and 411B, together forming a plate receiving slot. Cables 413A and 413B are both ground connections. A laminar plate 403 slips into each plate receiving slot. The primary factors to be considered for any metal or metal alloy contemplated for manufacture of the laminar plates are cost, resistance to corrosion, and electrical resistance. A suitable metal from which the laminar plates are fabricated includes, but is not limited to, nickel, nickel containing alloys, and stainless steel (which is typically a nickel alloy of steel). The case lower portion 401 will be filled with an electrolyte, thereby covering most of the surface area of the laminar plates 403A-403N. The electrolyte is an aqueous solution containing ions which enable the solution to conduct electricity. The electrolyte in which the laminar plates are submersed may be selected from many different types, including aqueous solutions of sodium bicarbonate, potassium bicarbonate, sodium hydroxide, potassium hydroxide, and combinations thereof. Potassium hydroxide is presently deemed the preferred compound for addition to distilled water for creating the electrolyte. It will be noted that laminar plates 403A and 403N both function as impermeable components of the case.

Figure 5:
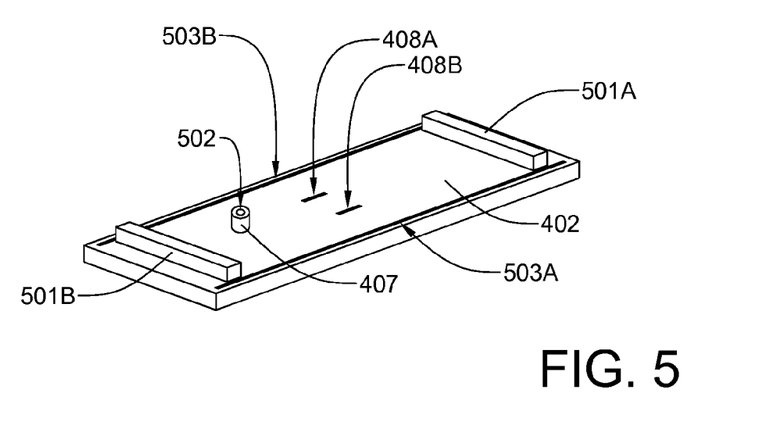
FIG. 5 is a bottom view of the case lid of the second embodiment electrolysis unit.

Referring now to FIG. 5, in this bottom view of the case lid 402, it can be seen how the gas outlet 407 extends below the lower surface of the lid 402 an amount that places the gas escape entrance 502 at the level of the top of the plates 403A-403M when the electrolysis unit 400 is assembled. In addition, two bars 501A and 501B, which are integral with the case lid 402, maintain the laminar plates 403 seated within their respective plate receiving slots when the case lid 402 is secured to the case lower portion 401. The case lid 402 is equipped with a pair of spaced apart grooves 503A and 503B. Laminar plates 403A and 403N fit into and are sealed into these two grooves to ensure that the case lid 402, which is adhesively sealed to the case lower portion 402 and the outermost laminar plates 403A and 403N, together form a waterproof compartment. An adhesive sealant can also be used to seal the side and bottom edges of the plates 403 within their respective grooves in order to minimize current leakage between the cells.

Figure 6:
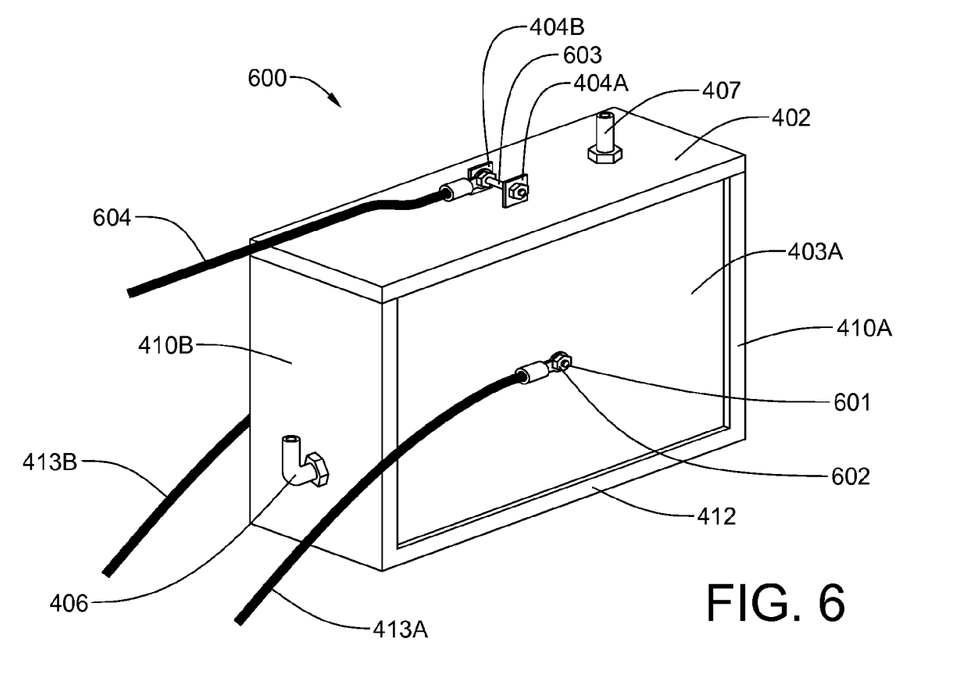
FIG. 6 is an isometric view of the assembled second embodiment electrolysis unit.

Referring now to FIG. 6, an assembled second embodiment electrolysis unit 600 has been assembled, with the fourteen laminar plates 403A-403N seated within their respective plate receiving slots within the case lower portion 401, the case lid 402 secured to the case lower portion 401, and the outermost laminar plates 403A and 403N seated and sealed within their respective circumferential grooves, which include their case receiving slots in the case lower portion 401 and the grooves in the case lid 402. A waterproof sealant, such as polyurethane adhesive/sealant may be used successfully to seal the case lid 402 to the case lower portion 401 and to seal the outermost laminar plates 403A and 403N within their respective perimetric grooves. As previously indicated, the partially-exposed laminar plates 403A and 403N will also be connected to chassis ground through conductors 405A and 405B, respectively. Conductor 405A is shown secured to an exposed major surface of laminar plate 403A with a threaded stud 601 and a nut 602. Likewise, connector tabs 404A and 404B are interconnected by a threaded connector 603, which is also connected to a nominal voltage of 12 VDC through conductor 604.

Figure 7:
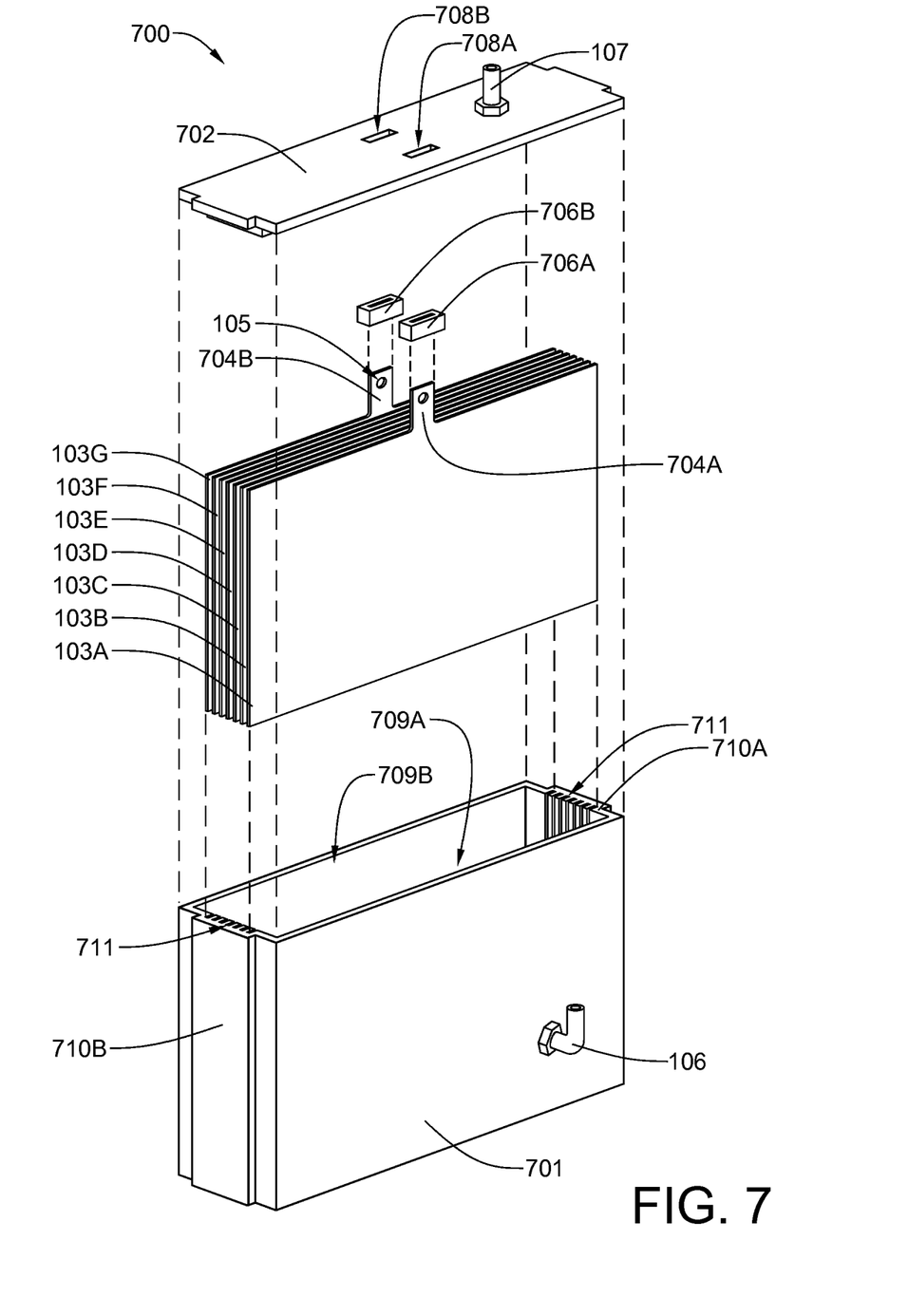
FIG. 7 is an exploded isometric view of a third embodiment electrolysis unit.

Referring now to FIG. 7, an exploded third embodiment electrolysis unit 700 is similar to the first embodiment electrolysis unit 100 or 300, except that it is a 12-volt DC unit, rather than a 24-volt DC unit. The third embodiment electrolysis unit 700 includes a case lower portion 701, a case lid 702, seven evenly-spaced, parallel laminar plates 103A-103G (103, generally). It will be noted that laminar plates 103A and 103G each have an electrical connector tab 704A and 704B, respectively, which extend from an upper central portion thereof. Each of the connector tabs has an aperture 105 for receiving a threaded fastener that will secure an electrical cable to the connector tab. One of laminar plates 103A or 103G will receive a chassis ground connection, while the other laminar plate will receive a connection to a nominal voltage of 12 VDC. It will be noted that the case lower portion 701 is equipped with an electrolyte inlet 106. It will be further noted that the case lid has a gas outlet 107. It will be further noted that the case lid 702 has two rectangular slits 708A and 708B, which fit over the two connector tabs 704A and 704B, respectively. It will also be noted that the case lower portion 701 is shaped so that there are two electrolyte supply chambers 709A and 709B on opposite sides of the laminar plate array when the latter is installed within the case lower portion 701. It will be further noticed that the case lower portion 701 has grooves 711 on the end side walls 710A and 710B. The floor panel (not shown) is also grooved. Each groove in the floor panel is aligned with a groove on each side panel 710A and 710B, together forming a plate receiving slot. A laminar plate 103 slips into each plate receiving slot. Resilient spacers 706A and 706B can be fitted over connector tabs and in order to more effectively seal the apertures where they pass through the lid 702.

Figure 8:
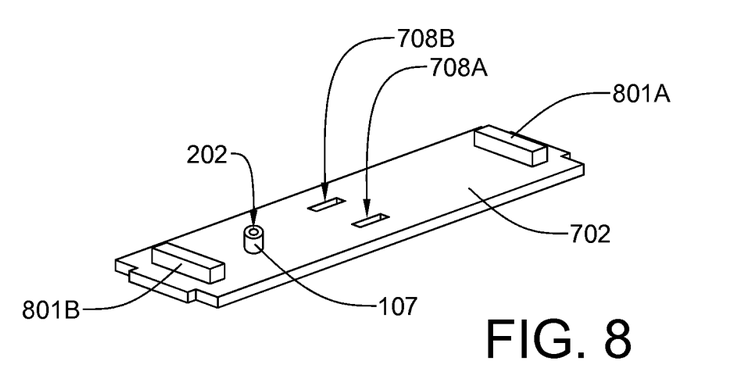
FIG. 8 is a bottom view of the case lid of the third embodiment electrolysis unit.

Referring now to FIG. 8, the underside of the lid 702 is visible. It is simply a narrower version of the lid 102 of the first embodiment unit 100. Again, it can be seen how the gas outlet 107 extends below the lower surface of the lid 102 an amount that places the gas escape entrance 202 at the level of the top of the plates 103A-103M when the electrolysis unit 700 is assembled.

Figure 9:
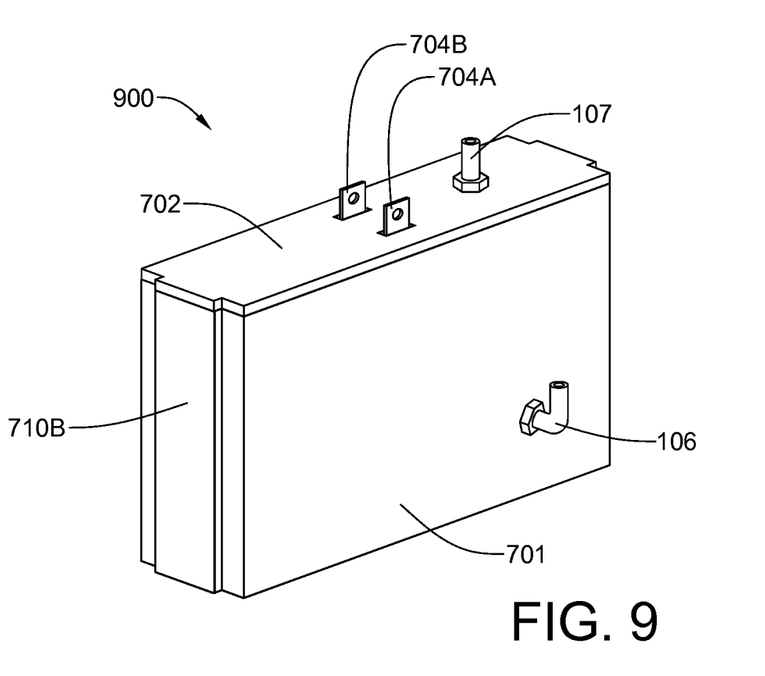
FIG. 9 is an isometric view of the assembled third embodiment electrolysis unit.

Referring now to FIG. 9, the assembled third embodiment electrolysis unit 900 is shown. It is a narrower 12-volt DC version of the first embodiment unit 300.

Figure 10:
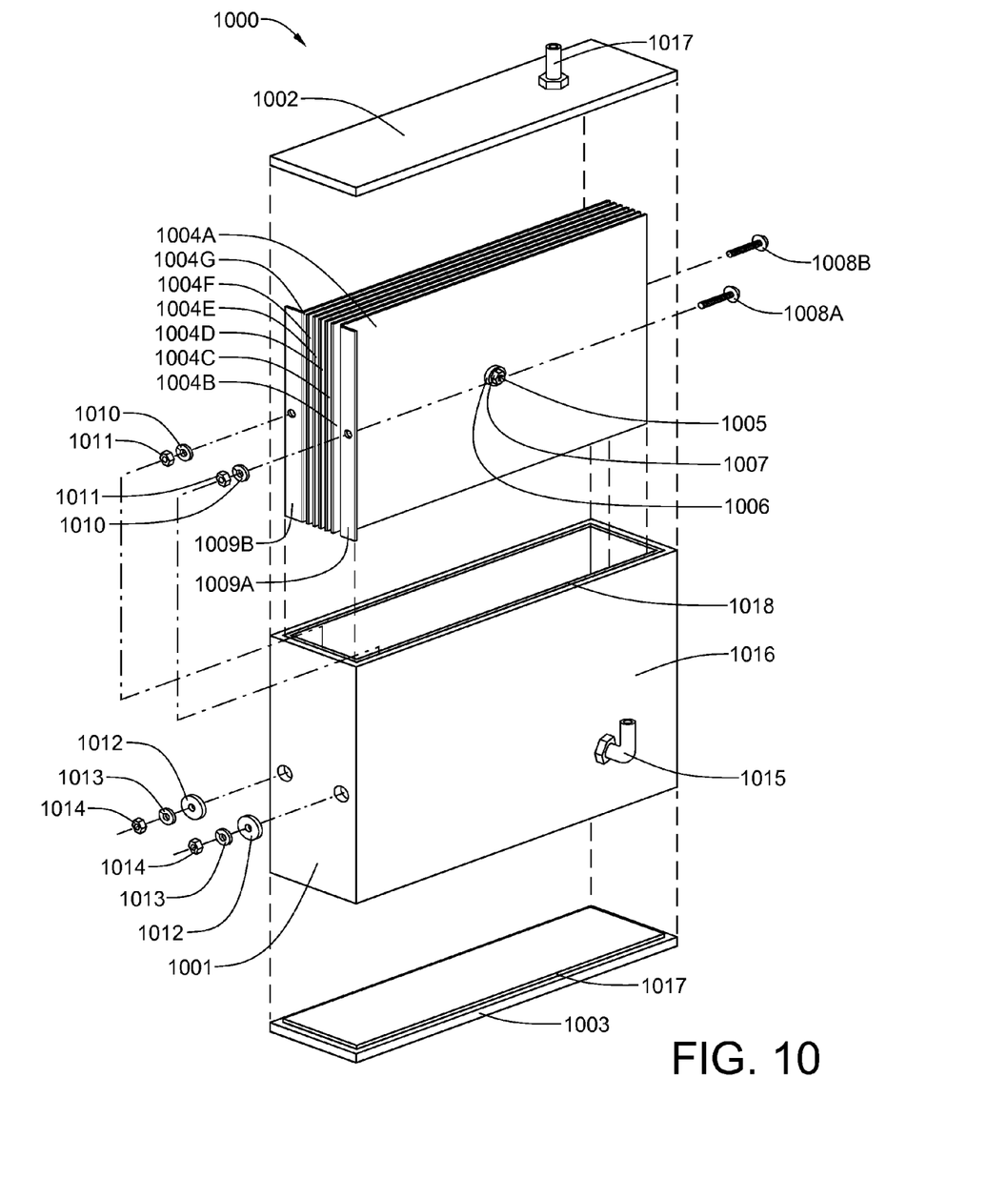
FIG. 10 is an exploded isometric view of a fourth embodiment electrolysis unit.

Referring now to FIG. 10, a fourth embodiment electrolysis unit 1000 has an ungrooved lower case portion 1001, an ungrooved lid 1002, and an ungrooved case bottom 1003. A dielectric screw 1005 passes through a central aperture of each plate 1004A-1004G. Each adjacent pair of plates has a dielectric washer sandwiched between them that is identical to the dielectric washer 1006 beneath the securing dielectric nut 1007. The dielectric screw 1005 passes through each sandwiched dielectric washer. When the screw 1005 is tightened through the plate assembly 1006, the plates 1004A-1004G assume a generally evenly spaced configuration. These plates are inserted as an assembly into an ungrooved lower case portion. However the lower and side edges of the plates are sealed to the sides and bottom of the case, respectively with a waterproof sealant, such as polyurethane sealant. The sealant is also preferably used with the embodiments having a grooved lower case portion in order to minimize current leakage between plates. As the side and bottom edges of the plates are sealed in the grooves or against a planar surface with a waterproof sealant, current leakage is limited only to the tops of the cells where the electrolyte sloshes or flows from one cell to another. In addition, holes are no longer deemed necessary for regulating electrolyte levels as shown in the referenced provisional patent application.

Still referring to FIG. 10, a waterproof sealant layer 1017 is applied to the upper surface of the case bottom 1003. In addition, a waterproof sealant layer 1018 is applied to the inner surfaces of the lower case portion 1001. For the fourth embodiment electrolysis unit, the input connections are made through a vertical end panel 1007 of the lower case portion 1001. Epoxy is used to effectively waterproof the holes in the case ends through which threaded terminals pass. Stainless steel screws 1008A and 1008B are used to provide a connection to flanges 1009A and 1009B on plates 1004A and 1004G, respectively. Each screw 1008A and 1008B is first secured to a flange 1009A or 1009B with a lock washer 1010 and a first nut 1011. The plate assembly 1006 is then secured to the end panel 1007 using a large washer 1012, a lock washer 1013, and a second nut 1014 installed on each of the two screws 1008A and 1008B. Like the first three embodiments 100, 400, and 700, the lid 1002 has a gas outlet that projects below the bottom surface of the lid 1002 so that the gas escape entrance thereof is at the same level as the top edges of the plates 1004A-1004G. It should be clear that as long as the gas outlet is positioned at a level that is about even with the top edges of the plates, current leakage through electrolyte covering the plates will be minimized. The electrolyte inlet 1015 is near the bottom of the lower case portion 1001 and is installed in a side panel 1016 thereof. The gas outlet 1017 is installed in the lid 1002. Like the other embodiments, its inlet is flush with the level of the top edges of the plates 1004A-1004G.

Figure 11:
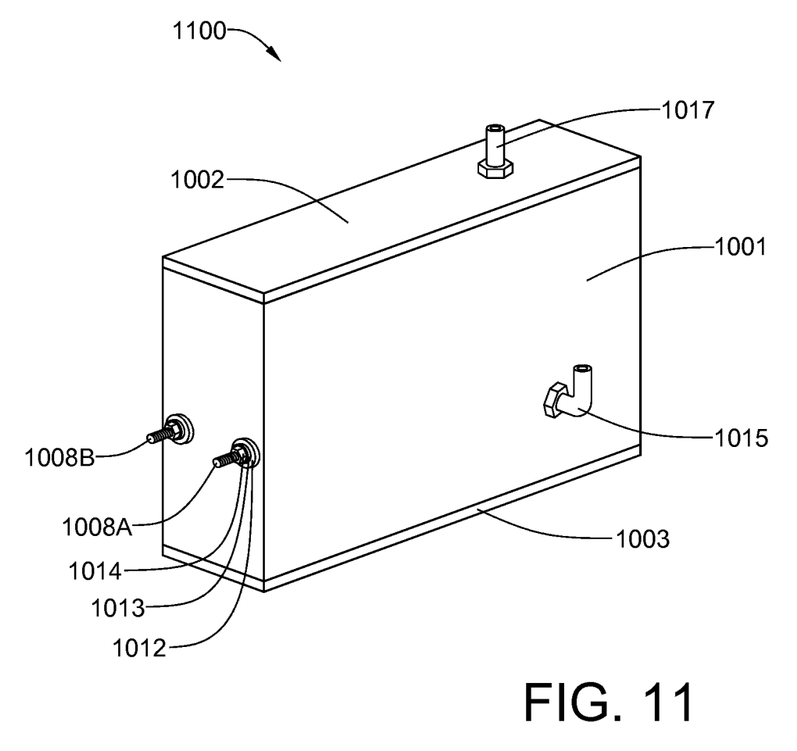
FIG. 11 is an isometric view of the assembled fourth embodiment electrolysis unit.

Referring now to FIG. 11, the fully assembled fourth embodiment electrolysis unit 1100 is shown.

Figure 12:
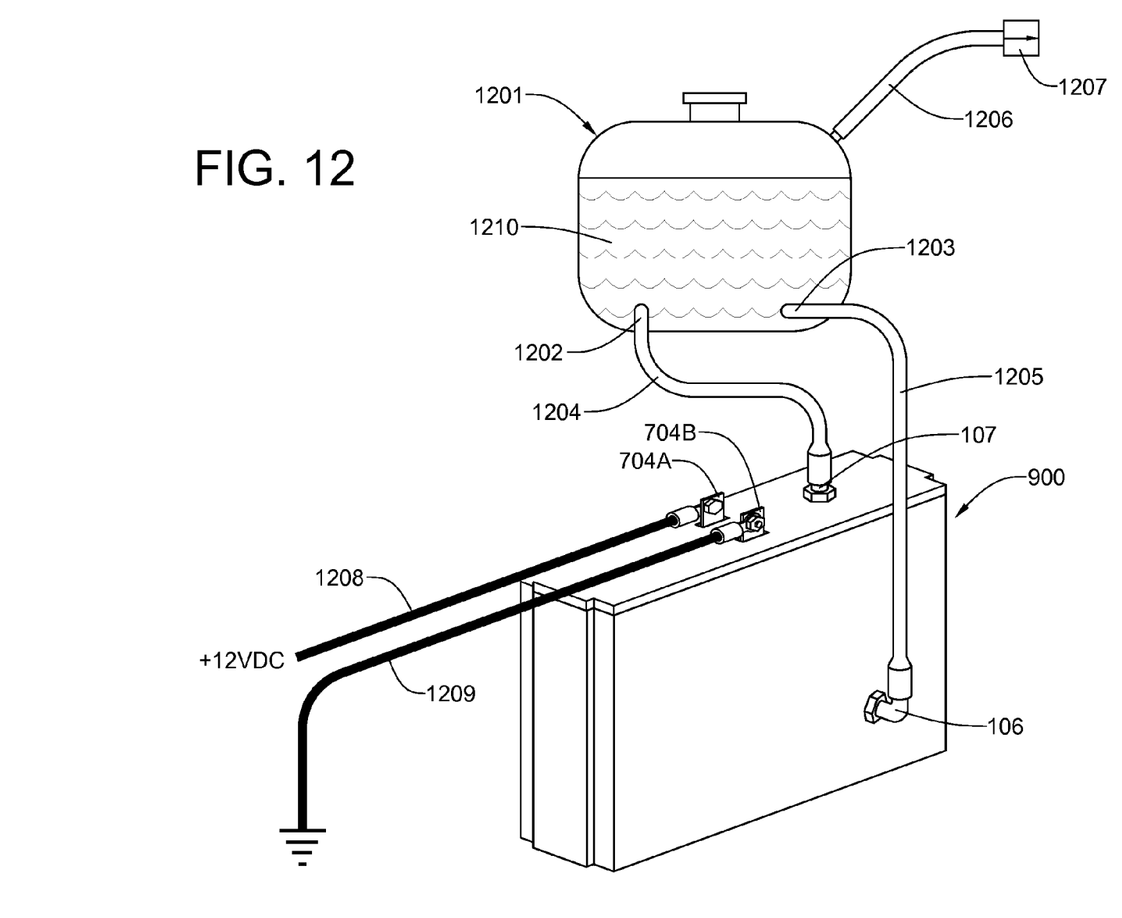
FIG. 12 is an isometric diagramatic view of an electrolyzer assembly which incorporates the third embodiment electrolysis unit.

Referring now to FIG. 12, an assembled third embodiment electrolysis unit 900 is shown coupled to an electrolyte supply tank 1201. It will be noted that the gas inlet/electrolyte overflow return inlet 1202 is coupled to the gas outlet 107 of the electrolysis unit 900 via return hose 1204, and that the electrolyte outlet 1203 is coupled to the electrolyte filler inlet 106 of the electrolysis unit 900 via supply hose 1205. Both the overflow return inlet 1202 and the electrolyte outlet 1203 are both located near the bottom of the supply tank 1201. Insulated cables 1208 (12-volt DC) and 1209 (ground) are connected to the appropriate projecting tabs 704A and 704B, respectively. It will be noted that the electrolyte outlet 1203 of the electrolyte supply tank 1201 is above the level of the upper edges of the plates 103A-103G within the electrolysis unit 700 so that gravity can maintain the electrolysis unit 900 filled to an optimum level. It will be further noted that the electrolyte tank 1201 is partially filed with electrolyte solution 1210, that hydrogen and oxygen gases generated within the electrolysis unit 900 enters the gas inlet/overflow return inlet 1202 and bubbles through the electrolyte 1210, after which the gases escape through the outlet hose 1206, which couples to the induction system of the vehicle in which the electrolysis unit 900 is installed. The cells (i.e., the gaps between adjacent plates) within the electrolysis unit are filled by electrolyte 1210 rising from the electrolyte filler inlet 1202 and then over the top edge of each plate. As bubbles of hydrogen and oxygen gas prevent the electrolyte from rising above the level of the gas outlet 107, the electrolyte level is self regulating, and no pump is required to fill the electrolysis unit. The outlet hose 1206 is equipped with a one-way valve 1207, which prevents flashbacks from reaching the electrolyte tank if the vehicle's engine backfires.

It should be understood that although the drawings show electrolysis units built using six-cell blocks, seven-cell blocks and eight-cell blocks may also be used for nominal 12 VDC electrical systems—particularly if the voltage seldom drops below 12 VDC. For nominal 24 VDC electrical systems, electrolysis units built using 12- to 14-cell blocks may be fabricated. The limiting criterium is that the minimum cell voltage must be no less than about 1.5 VDC. It will also be noted that all electrical connections are shown as being made outside the case first, second and third embodiment electrolysis units 300, 600, and 900, respectively, in order to minimize the possibility that a loose connection might detonate the hydrogen and oxygen gas mixture within the case.

Preferred materials for the dielectric case components are engineering polymer plastic materials which have improved resistance to heat, increased rigidity, greater mechanical strength, and increased levels of chemical stability. Examples of such engineering plastics include acrylonitrile butadiene styrene (ABS), polycarbonates (PC), polyamides (PA), polybutylene terephthalate (PBT), polyethylene terephthalate (PET), polyphenylene oxide (PPO), polysulphone (PSU), polyetherketone (PEK), polyetheretherketone (PEEK), and polyimides. Although not considered engineering plastics, Sintra® (a moderately-expanded, closed-cell rigid PVC sheet material developed in Europe by Alusuise, UHDPE (ultra-high molecular weight poly ethylene) and HDPE (high-density poly ethylene) may also be used successfully for the case material.

From the foregoing disclosure, it should be apparent that the number of plates in an electrolysis unit is determined by the applied voltage. Six cells are considered an optimum number for 12-volt systems; twelve cells are considered an optimum number for 24-volt systems; eighteen cells are considered an optimum number for 36-volt systems; twenty-four cells are considered an optimum number for 48-volt systems; and so forth. The total number of plates is limited only by the length of available dielectric screws used to hold the plates in an evenly-spaced arrangement. Electrical connections to the plates are preferably made outside the electrolysis unit, and can be made on the sides or top of the plates using a variety of techniques as heretofore shown and described.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention as hereinafter claimed.

What is claimed is:

1. An electrolyzer assembly for generating oxygen and hydrogen gas for use in an internal combustion engine, said electrolyzer assembly comprising:
    an electrolysis unit having
        a hermetically-sealed case, a portion of which is made from a durable dielectric polymer material, said case having a gas outlet and an electrolyte inlet; and
        at least one set of seven, series-coupled, generally equally-spaced, rectangular, vertically-oriented metal plates installed within the case, said set of plates providing six cells for each nominal 12 volts of electromotive force supplied, and said plates having their side edges and bottom edges sealed to the case walls and case bottom, respectively, in order to minimize current leakage between plates when voids between each pair of adjacent plates are filled with electrolyte;
    wherein two outer rectangular plates of said at least one set are provided with connections to ground, and function as part of the case, being adhesively sealed to a polymer material case portion around its four edges.

2. The electrolyzer assembly of claim 1, wherein each vertically-oriented plate is provided with a single aperture, and spacing between the plates is provided solely by a dielectric spacing washer positioned between each adjacent pair of plates and that is axially aligned with the apertures, with a threaded dielectric screw being inserted through the aperture in each plate and through each spacing washer, and secured at each end thereof so that each spacing washer is compressed between each adjacent pair of plates.

3. The electrolyzer assembly of claim 1, wherein said gas outlet is positioned on top of said case at a level that is even with a top edge of each plate, and said electrolyte inlet is positioned on said case near a bottom thereof.

4. The electrolyzer assembly of claim 1, which further comprises an electrolyte supply tank having an electrolyte outlet coupled to the electrolyte inlet of said case, said electrolyte outlet being positioned at a level that is higher than a top edge of each plate so that gravity will cause electrolyte to flow from said supply tank and fill the electrolyzer unit.

5. The electrolyzer assembly of claim 1, wherein a gas escape entrance of said gas outlet is positioned at a level even with an upper edge of each of at least three plates.

6. The electrolyzer assembly of claim 1, wherein a bottom and side edges of each plate fit within a groove within the polymer material portion of the case, each groove being equidistantly spaced from adjacent grooves.

7. The electrolyzer assembly of claim 1, wherein electrical connections are made to at least one outer plate.

8. The electrolyzer assembly of claim 1, wherein electrical connections are made through tabs which pass through the top panel, each tab being integral with one plate.

9. An electrolyzer assembly for generating oxygen and hydrogen gas for use in an internal combustion engine, said electrolyzer assembly comprising:
    an electrolysis unit having
        a hermetically-sealed case made at least partially from a durable dielectric polymer material, said case having four wall panels, a top panel, a bottom panel, a gas outlet installed in said top panel, and an electrolyte inlet installed in a wall panel;
        two ganged sets of series-coupled, generally equally-spaced, rectangular, vertically-oriented metal plates installed within the case, each set of metal plates having first and second end plates, with first plates of each set being positioned adjacent one another, each plate having each side edge sealed to a case wall panel and its bottom edge sealed to said bottom panel in order to minimize current leakage between plates;
    wherein a first voltage level connection is provided to each first end plate, and a second voltage level connection is provided to each second end plate, the quantity of plates in each set being chosen so as to provide a voltage between adjacent plates of 1.5-2.0 volts when voids between each adjacent pair of plates filled with electrolyte and said first and second end plates are connected to a DC voltage source.

10. The electrolyzer assembly of claim 9, wherein each vertically-oriented plate is provided with a single aperture, and spacing between the plates is provided solely by a dielectric spacing washer positioned between each adjacent pair of plates and that is axially aligned with the apertures, with a threaded dielectric screw being inserted through the aperture in each plate and through each spacing washer, and secured at each end thereof so that each spacing washer is compressed between each adjacent pair of plates.

11. The electrolyzer assembly of claim 9, wherein said gas outlet is installed in said top panel such that its gas escape entrance is at a level that is even with a top edge of each plate, and said electrolyte inlet is positioned in a wall panel near a bottom of the case.

12. The electrolyzer assembly of claim 9, which further comprises an electrolyte supply tank having an electrolyte outlet coupled to the electrolyte inlet of said case, said electrolyte outlet being positioned at a level that is higher than a top edge of each plate so that gravity will cause electrolyte to flow from said supply tank and fill the electrolysis unit at least up to the top edges of at least all but the first and second outer plates.

13. The electrolyzer assembly of claim 9, wherein a bottom edge and side edges of each plate fit within a slot within the polymer material portion of the case, each slot being equidistantly spaced from adjacent slots.

14. The electrolyzer assembly of claim 9, wherein an outer rectangular plate of each set is provided with a connection to ground, and functions as part of the case, being adhesively sealed to a polymer material case portion around its four edges.

15. The electrolyzer assembly of claim 14, wherein electrical connections are made to at least one outer plate.

16. The electrolyzer assembly of claim 9, wherein electrical connections are made through tabs which pass through the top panel, each tab being integral with one plate.

17. An electrolyzer assembly for generating oxygen and hydrogen gas for use in an internal combustion engine, said electrolyzer assembly comprising:
   an electrolysis unit having
      a hermetically-sealed case made at least partially from a durable dielectric polymer material, said case having four wall panels arranged in a rectangular configuration, top panel and bottom panels which are mutually parallel and perpendicular to said wall panels, a gas outlet installed in said top panel having a gas escape entrance that is at a level that is even with a top edge of each plate, and an electrolyte inlet installed in a wall panel near a bottom thereof;
      two ganged sets of series-coupled, generally equally-spaced, rectangular, vertically-oriented metal plates installed within the case, said at least one set of metal plates having first and second end plates, each plate having each side edge sealed to a case wall panel and its bottom edge sealed to said bottom panel in order to minimize current leakage between plates, and said sets positioned such that an end plate of one set is adjacent an end plate of the other set having the same ordinal number;
   wherein a first voltage level connection is provided to each first end plate, and a second voltage level connection is provided to each second end plate, the quantity of plates in each set being chosen so as to provide a voltage between adjacent plates of 1.5-2.0 volts when voids between each adjacent pair of plates filled with electrolyte and said first and second end plates are connected to a DC voltage source.

18. The electrolyzer assembly of claim 17, which further comprises an electrolyte supply tank having an electrolyte outlet coupled to the electrolyte inlet of said case, said electrolyte outlet being positioned at a level that is higher than a top edge of each plate so that gravity will cause electrolyte to flow from said supply tank and fill the electrolysis unit at least up to the top edges of at least all but the first and second outer plates.

19. The electrolyzer assembly of claim 17, wherein electrical connections to the electrolysis unit are selected from the group of connection alternatives consisting of at least one connection through a case end panel to a flange adjacent a vertical edge of an outer plate, at least one connection through a case top panel via a tab which passes through a slit in the top panel and which is integral with one plate, and at least one connection to a partially-exposed outer plate made on a major surface thereof.

* * * * *